C. B. WITHINGTON.
Harvesters.

No. 150,992. Patented May 19, 1874.

3 Sheets--Sheet 1.

Witnesses.
James Martin Jr.
J. N. Campbell

Inventor:
Charles B. Withington
by
Mason, Fenwick & Lawrence.

C. B. WITHINGTON.
Harvesters.
No. 150,992.  Patented May 19, 1874.
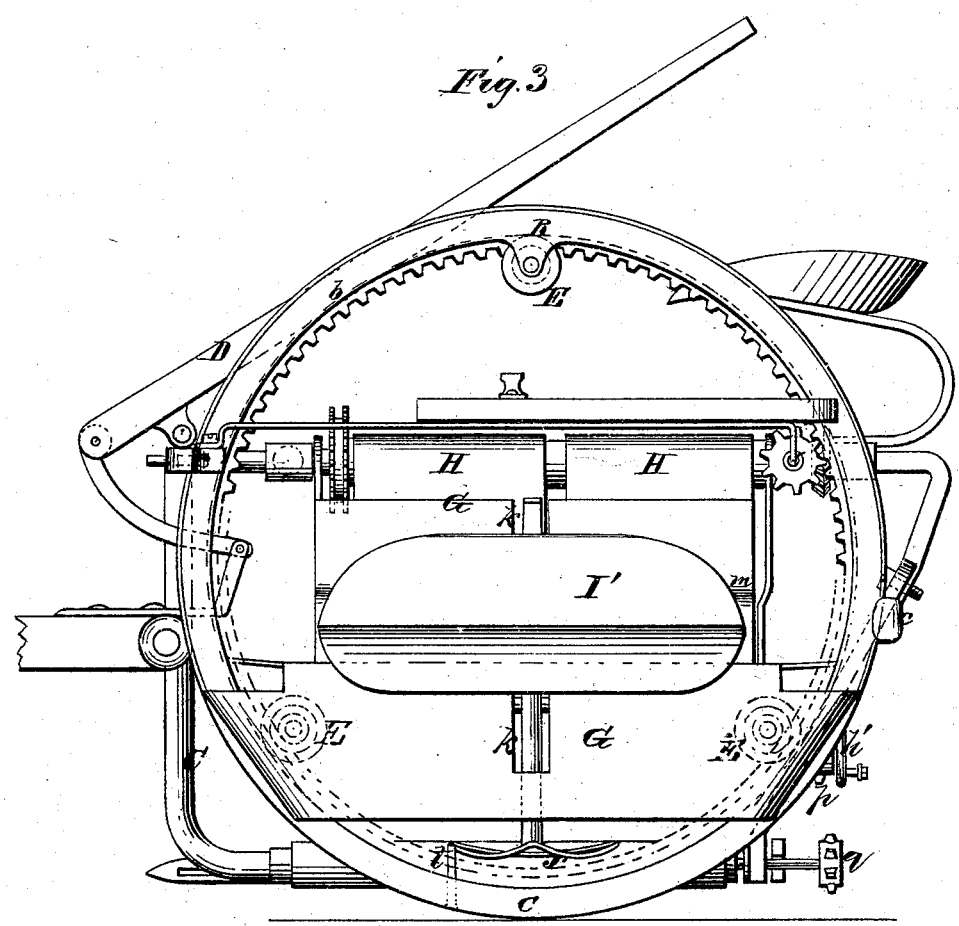
Fig. 3
Fig. 4
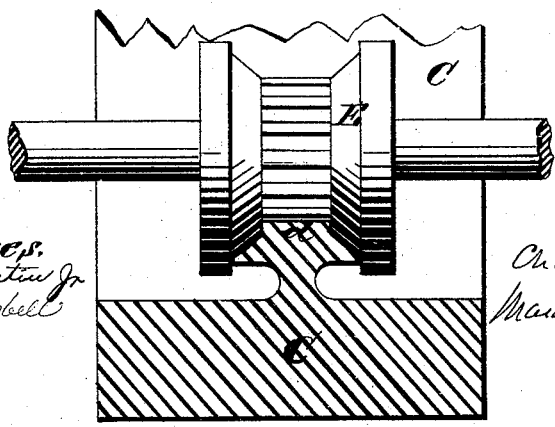
Witnesses:
James Martin Jr
J. N. Campbell
Inventor:
Charles B. Withington
by
Mason, Fenwick & Lawrence

UNITED STATES PATENT OFFICE.

CHARLES B. WITHINGTON, OF LEWISBURG, PENNSYLVANIA.

IMPROVEMENT IN HARVESTERS.

Specification forming part of Letters Patent No. 150,992, dated May 19, 1874; application filed March 5, 1874.

CASE A.

*To all whom it may concern:*

Be it known that I, CHARLES B. WITHINGTON, of Lewisburg, in the county of Union and State of Pennsylvania, have invented a new and useful Improvement in Harvesters; and I do hereby declare that the following is a full, clear, and exact description thereof, reference being had to the accompanying drawings making part of this specification, in which—

Figure 1:
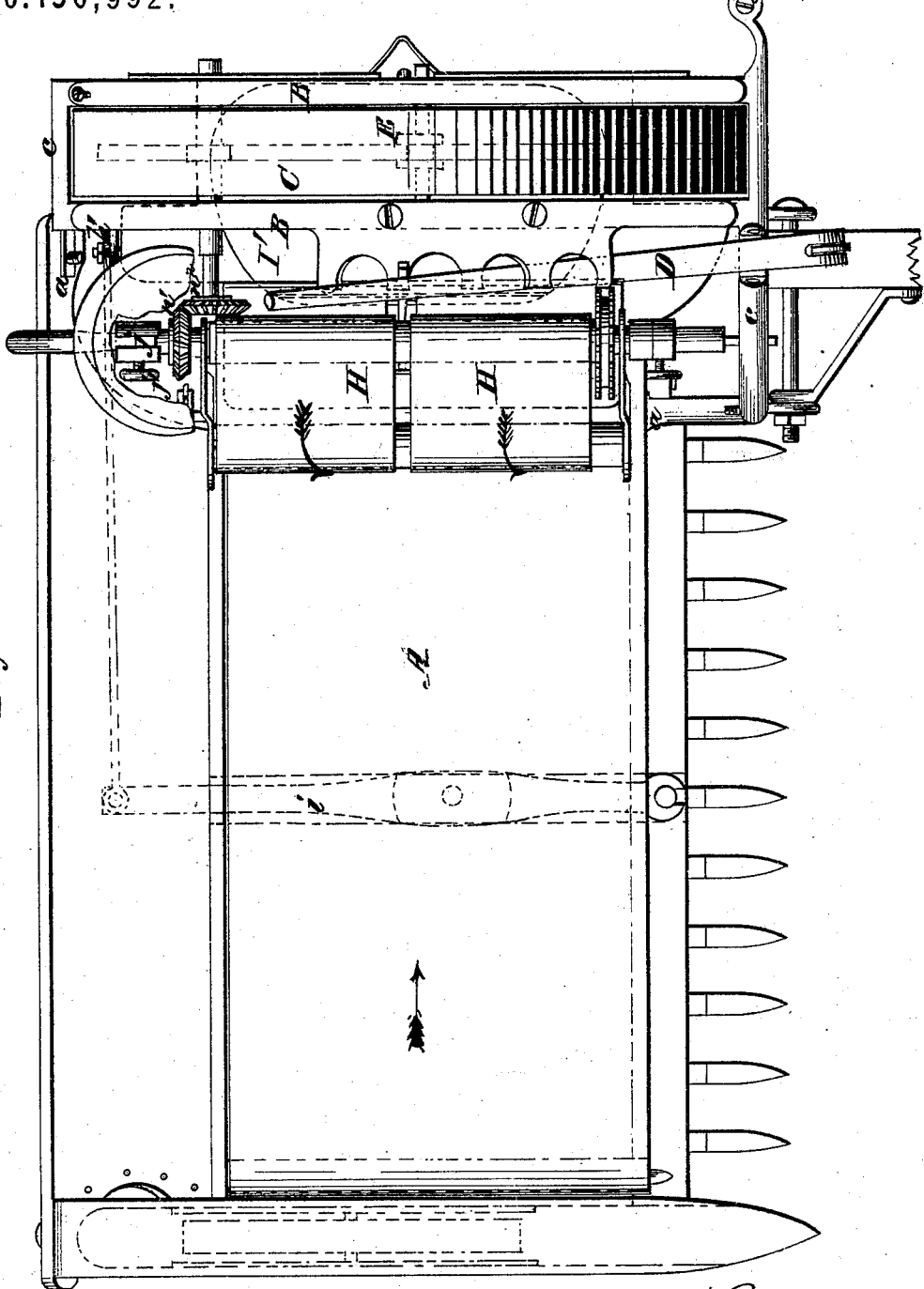
Figure 2:
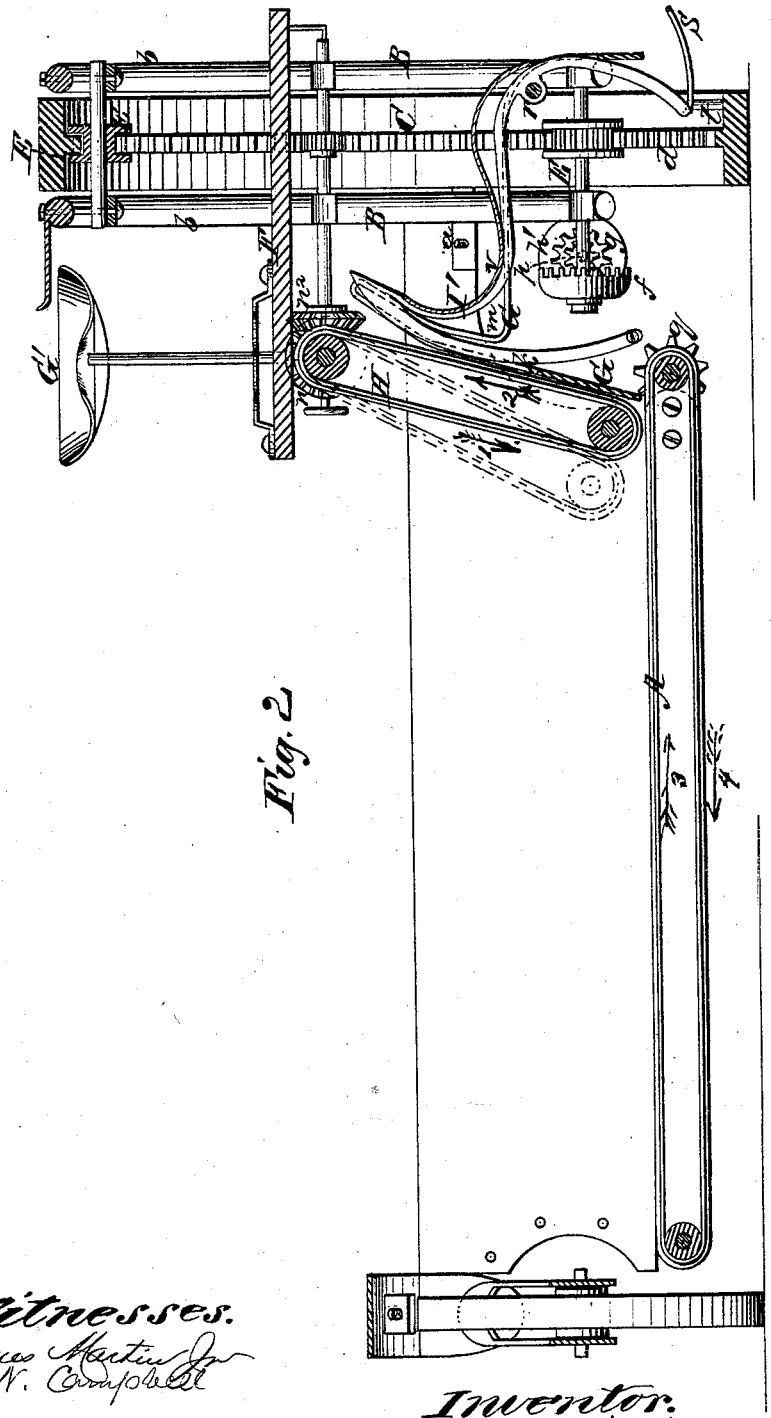

Figure 1 is a top view of a harvester with my invention applied to it. Fig. 2 is a vertical longitudinal section of the same. Fig. 3 is an end elevation of the same looking toward the grain side of the machine. Fig. 4 is a vertical section of a part of the drive-wheel and gear slightly modified.

The object of my invention is to overcome many of the difficulties attending the use of self-delivering grain-platforms, automatic rakes, and binding devices upon harvesters; and also to facilitate the delivery of grain from stationary platforms with hand-rakes upon the stubble side of the field out of the path of the team on the return trip.

As harvesters have heretofore been constructed, it has generally been necessary under one class of machines to deliver the grain on the inside of the draft-frame in line with the path of the team, or at right angles to that path at the back end of a quadrant platform; and under another class to carry the grain over the top of the drive-wheel, and deliver the grain to the binders on the outer side of the drive-wheel or draft-frame.

The nature of my invention consists, first, in a harvester constructed with a grain-delivery passage through its drive wheel or wheels, and through the supports of said wheel or wheels, whereby the point of delivery for the grain is brought in very close proximity to the point where the grain falls after being cut. This construction may be such that the grain can be delivered directly upon the ground through the drive-wheel by an endless carrier, or by an automatic rake or hand-rake, or it may be deposited within the perimeter of the wheel upon a gavel former and receiver, and then tilted upon the ground, or it may be delivered within the wheel to a binding-machine or to hand-binders, bound, and then delivered upon the ground. My invention greatly compacts the harvesting-machine, and also brings the weight of the mechanism, which is used for automatically delivering grain, or of the binding mechanism, or hand-binders, nearer to the supporting-axis of the draft-frame, and thus lessens the tendency of the machine to tilt over, while the labor and time of getting the grain off the platform are greatly reduced. The cost of the machine and the labor upon the team are greatly decreased. My invention consists, second, in the combination, with an open drive-wheel, of an endless travelling platform, a pendulous apron, and an inclined grain-board, whereby the grain is received from the platform and elevated, under a slight compression, between itself and the grain-board until delivered to a receiver or upon the ground; and whereby, also, any bulk of grain which may come between the platform and the apron at the point of junction may be admitted between the apron and the grain-board without danger of clogging or derangement of the parts; third, in the combination, with an open drive-wheel, of a tilting grain-receiver, which acts as a stop, while it is discharging a gavel, to the grain which is being delivered from the platform to the point where the receiver is located; fourth, in the combination of the tilting receiver with a drive-wheel, which is constructed with a grain-delivery passage through it, whereby the said receiver can be located in the wheel, and operated by the same as the wheel revolves; fifth, in a slotted grain-board, which extends up from the delivery-platform a proper distance, then turns and passes over to and through the drive-wheel, whereby the grain as fast as cut may be received and held within the wheel until taken by hand-binders, or a binding-machine and bound.

To enable others skilled in the art to understand my invention, I will proceed to describe it.

In carrying out the first feature of my invention, any of the known styles of cutting apparatus, and side-delivery grain-platforms may be adopted.

In the accompanying drawings, I have applied my invention, as a convenient mode of illustrating it, to a harvester having an endless-belt platform, A. The frame of this platform extends to a rigid draft-frame, B, and is bolted firmly to the same, as shown at $a\ a$. The draft-frame B may consist of arched pieces $b\ b$, set apart so as to admit the drive-wheel C between them, and tied firmly together by transverse bars $c\ c$, so as to give an unobstructed passage through it at all points of the circle or arch of the frame, and also afford supports for the gearing, the platform, and the lever D, by which the cutting apparatus is adjusted to cut high or low. The drive-wheel C is an annulus or ring without a hub and arms. On the inner circumference of this ring cog-teeth $d$ are formed by constructing a raised T-rail, as shown in Fig. 1, or Fig. 4. I prefer the plan shown in Fig. 4, as it gives a bevel-friction surface or bearing for gear-wheels outside of the margin of the teeth, and thus saves the gears from wearing away too rapidly. This ring or annulus is kept in position so as to revolve between the arched bars of the frame by means of grooved toothed pinions E, which are hung at points equidistant from one another upon shafts which are supported by the frame B. These pinions may be constructed as in Fig. 4, so as to have a bevel-bearing surface matching that of the annulus or ring drive-wheel. With the draft-frame and drive-wheel thus constructed and combined, a free unobstructed passage for the grain from the platform through the wheel is secured. In order to drive the sickle, the shaft of one of the pinions E is extended beyond the under side of the frame, and on its end a bevel-wheel, $f$, is secured, and made to gear with a pinion, $g$, on a pitman-shaft, $h$, as shown. The pitman in this instance is carried along from the wrist-pin of the disk $h'$ to a vibrating lever, $i$, under the center of the platform, and connected with the sickle. It will be understood that while it will be esssential in order to secure the open passage through the drive-wheel to gear from the inner circumference thereof it is not necessary that the pitman for driving the sickle shall be arranged at any one particular point of the circumference of the drive-wheel. This position will be changed according to the style of harvester to which the invention is applied. F is a shield extended through the drive-wheel so as to cover the gearing below. This shield serves as a foot-board for the driver, who rides in the seat G'. The seat and shield are supported upon the frame B in the manner shown, or in other appropriate manner. The seat is adjustable back and forth by means of a sleeve, $j$, to which it is attached, and which is secured in any adjusted position by a set-screw, $j'$. G is an inclined grain-board arranged at the inner terminus of the endless apron A. This board has a slot, K, cut in it from its top down to near the middle of its depth, and at about the center of its width. From the point where the slot begins the board is curved or bent toward the drive-wheel, and continued laterally in form of a cyma reversa, or nearly so, and terminated outside of the drive-wheel and draft-frame, as shown. It thus forms a platform upon which the grain may fall, to be taken by hand-binders or a binding-machine. The exact form of this continued portion is not material, but it is useful to have it concave as at $m$, so as to retain the grain in a gathered condition, or in form of a gavel. The lower end of this board, where it touches the platform, may be notched or toothed like a comb, so as to work with notched slats on the apron. H is a pendulous endless apron, set inclined and against the inclined grain-board. Its upper end is placed around a pulley-shaft, $n$, in such a manner that its lower end can swing in the arc of a circle, as illustrated by dotted lines. The apron may be in one or more strips. To give motion to this endless apron and also to the endless platform, the following means are employed: A shaft of one of the pinions E is extended inward beyond the draft-frame, and on its end a bevel-wheel, $n^2$, is applied. This wheel gears with a bevel-wheel, $n^1$. By this gearing the apron H is caused to revolve in the direction of the arrows 1 and 2. For moving the endless platform a sprocket-wheel, $p$, is placed on the pitman-shaft, and a sprocket-wheel $q$, on the inner roller of the said apron, and these two wheels are connected by a chain-belt. By this means the platform is caused to revolve in the direction indicated by the arrows 3 and 4. I is a bar, of nearly S-form, arranged within the circle of the drive-wheel, and pivoted to the draft-frame at $r$. That part of this bar which is back of the pivot $r$ is partly straight and partly concave, and extends back to the inclined portion of the grain-board. Its position is in the slot of said board. To the top side of this bar a grain-receiver, I', of nearly S-form, is fastened. The highest part of this receiver is a considerable distance below the highest point of the bar. The object of this depression of the receiver is, that when the receiver tilts on its pivot to discharge a collected gavel of grain, the extended end of the bar shall rise above the delivery end of the inclined grain-board, and act as a stop to prevent any grain from coming over until the receiver has returned to its receiving position. In connection with this the yielding or pendulous character of the apron H is important, as it yields and allows room for incoming grain during this momentary arrest of the grain, which has been carried up to the delivering-point of the inclined grain-board. In order to make the tilting-receiver automatic a V-shaped cam, S, is formed on its outer lower end, and a trip-pin, $t$, is attached to the wheel C. As the wheel revolves the pin strikes the cam $s$ and glides along its inclined side, and thereby causes the said lower end to be forced inward, and its upper end to be thrown outward sufficiently to discharge the gavel. The construction of the gavel-receiver is such that the discharge is instantaneous, and not with a dragging action. This is due to the nearly flat form given to the receiver between its pivot and its concave portion.

I contemplate discharging the grain directly upon the ground in some cases, and to do this the grain-board and tilting device shown will be removed and a single-apron platform adopted, such platform extending on a slight inclination through the wheel; or a short apron, such as shown, may be combined with the platform and made to extend through the wheel; or an inclined slatted stationary receiving-apron may be extended through the wheel. I also contemplate having a stationary platform, the inner end of which is extended through the wheel, and to discharge the grain by any of the automatic raking devices which may be adapted for delivering the grain through the wheel, or by a hand-rake. I also contemplate using pins or hooks upon the aprons for insuring the delivery of the grain; also notched slats upon the endless traveling platform A.

What I claim as my invention, and desire to secure by Letters Patent, is—

1. An open drive-wheel, in combination with a platform upon which the cut grain falls, and from which it is delivered through said wheel, substantially as set forth.

2. The combination, with the open drive-wheel and the platform upon which the cut grain falls, of the intermediate apron and the grain-board, and a receiver arranged within the opening of the wheel, substantially as and for the purpose described.

3. The combination of the receiver, which is constructed to be tilted to discharge the gavel of grain with the open drive-wheel, said receiver being arranged within the said drive-wheel, substantially as and for the purpose set forth.

4. The combination, with the open drive-wheel and the trip-pin thereof, of the tilting-receiver, constructed to receive and discharge the grain in gavels, act as a stop to the grain being delivered from the platform, and with a cam on its outer end, substantially as described.

5. The inclined grain-board G, slotted and extended through the drive-wheel, substantially as described.

CHARLES B. WITHINGTON.

Witnesses:
J. N. CAMPBELL,
JAMES MARTIN, Jr.